(12) United States Patent
Graham et al.

(10) Patent No.: US 7,704,606 B2
(45) Date of Patent: *Apr. 27, 2010

(54) METHOD FOR ACHIEVING RECOAT ADHESION OVER A FLUORINATED TOPCOAT

(75) Inventors: William Frank Graham, Wayne, PA (US); Douglas Robert Anton, Wilmington, DE (US); Jeffery W. Johnson, Rochester, MI (US); Michael Joseph Michalczyk, Wilmington, DE (US); Sape Kwesi Quashie, Southfield, MI (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 340 days.

This patent is subject to a terminal disclaimer.

(21) Appl. No.: 12/012,557

(22) Filed: Feb. 4, 2008

(65) Prior Publication Data

US 2008/0131595 A1 Jun. 5, 2008

Related U.S. Application Data

(62) Division of application No. 10/668,992, filed on Sep. 22, 2003, now Pat. No. 7,348,389.

(51) Int. Cl.
*B32B 27/30* (2006.01)
(52) U.S. Cl. .................... 428/425.5; 526/279; 526/291
(58) Field of Classification Search .............. 428/425.5; 526/279, 291
See application file for complete search history.

(56) References Cited

U.S. PATENT DOCUMENTS

| 4,518,726 | A | * | 5/1985 | Kato et al. | .................... 524/32 |
| 6,447,919 | B1 | * | 9/2002 | Brown et al. | ................ 428/422 |

* cited by examiner

*Primary Examiner*—Kuo-Liang Peng
(74) *Attorney, Agent, or Firm*—Gann G. Xu

(57) ABSTRACT

A method for repairing a basecoat/clearcoat finish or coating comprised of a fluorinated organosilane topcoat. A fluorinated urethane additive is added to the fluorinated organosilane topcoat composition to improve recoat adhesion with the repair basecoat.

8 Claims, No Drawings

METHOD FOR ACHIEVING RECOAT ADHESION OVER A FLUORINATED TOPCOAT

CROSS-REFERENCE TO RELATED APPLICATION

This is a divisional of U.S. patent application Ser. No. 10/668,992, which has been granted but not issued.

BACKGROUND OF THE INVENTION

This invention is directed to a method for recoating a substrate previously coated with a basecoat/topcoat system in which the topcoat composition comprises a fluorinated organosilane polymer. In particular, this invention is directed to a method for obtaining recoat adhesion, especially during in-line and end-of-line repair of the finish of an automobile or truck during their original manufacture.

In order to protect and preserve the aesthetic qualities of the finish on an automobile or other vehicle, it is generally known to provide a clear (unpigmented or slightly pigmented) topcoat over a colored (pigmented) basecoat, so that the basecoat remains unaffected even on prolonged exposure to the environment or weathering. This is referred to as a basecoat/topcoat or basecoat/clearcoat finish. It is also generally known that fluorocarbons provide top coatings that remain relatively dirt free under exterior use conditions and are easily cleaned when soiled, for example by washing with water. Exemplary of prior art patents disclosing top coatings containing fluorocarbon constituents are U.S. Pat. No. 4,812,337; U.S. Pat. No. 5,597,874; U.S. Pat. No. 5,605,956; U.S. Pat. No. 5,627,238; U.S. Pat. No. 5,629,372; and U.S. Pat. No. 5,705,276. Given that it is well known that consumers prefer automobiles and trucks with an exterior finish having an attractive aesthetic appearance, rapid soiling of the finish is ever more undesirable.

Commercialization of fluorinated topcoat finishes, however, has been hindered by several significant or even critical technical hurdles. For example, a commercially practical finish, among other requirements, must have adequate adhesion to repair coatings, or what is known in the art as recoat adhesion, since defects in the finish may occasionally occur during the original manufacturing process, necessitating on-site repair. Additionally, a commercially practical finish must not be problematic or difficult to apply.

SUMMARY OF THE INVENTION

In conventional in-line or end-of-line repair of an automobile finish, a repair basecoat/clearcoat system is applied over a previously cured, but defective original basecoat/clearcoat. The total finish is then subjected to another cure cycle. Sanding or removal of the defective finish is normally omitted. The repair (second) basecoat is expected to adhere to the original (first) clearcoat at normal cure conditions.

During the development of fluorinated topcoat compositions, particularly topcoats containing fluorinated silane polymers which due to strong silane bonding when cured provide finishes with excellent scratch resistance and resistance to etching from acid rain and other environmental pollutants, applicants found that conventional repair basecoats showed poor or inadequate adhesion to the cured topcoat. This poor adhesion is believed due to the phenomenon of fluorine stratification at the outside surface (the side in contact with air) of the clearcoat. While such stratification is generally desirable, since it contributes to very low surface energy, high water and oil repellency, and hence outstanding stain resistance and cleanability, nevertheless such stratification appears to also have an adverse effect on what is known in the art as recoat adhesion. Applicants were able to solve this problem of recoat adhesion by including in the original topcoat composition an adhesion improving additive comprising a fluorinated urethane compound, which is reactive with an alkylated melamine formaldehyde or other aminoplast resin crosslinking agent normally present in the repair basecoat.

The claimed invention is therefore directed to a method for repairing an original basecoat/topcoat finish in which the original topcoat comprises a cured fluorinated silane polymer. The repair method comprises:

(a) applying a basecoat composition, comprising an aminoplast resin crosslinking agent, to a substrate having a top coating comprising a fluorinated silane polymer and an adhesion improving additive comprising a fluorinated urethane compound substantially cured thereon;

(b) applying a topcoat composition over said basecoat; and (c) curing the new basecoat/topcoat finish.

By the term "substantially cured" or "partially cured" is meant that, although at least some curing has occurred, further curing may occur over time.

In a preferred embodiment, the repair and original basecoat compositions are the same and the original and repair topcoat or clearcoat compositions are the same. The topcoat composition suitably comprises from about 45 to 90% by weight of binder, and the binder comprises 10 to 90% by weight, preferably 40 to 80%, of a fluorinated silane polymer. Preferably, the fluorinated silane polymer is the polymerization product of a monomer mixture of which about 1.5 to 70% by weight, preferably 5 to 50%, are ethylenically unsaturated monomers which contain a silane functionality and of which about 0.5 to 25% by weight, preferably 1 to 10%, are ethylenically unsaturated monomers which contain a fluorine functionality.

The claimed invention further includes a repairable topcoat composition usable in the present method and a coated substrate prepared according to the present method.

The method of the present invention is especially useful for forming a clear fluorinated topcoat over a pigmented basecoat. Such a topcoat can be applied over a variety of basecoats, including basecoats containing water or organic solvent and powder basecoats.

DETAILED DESCRIPTION OF THE INVENTION

As indicated above, this invention relates to the application of coatings involving fluorine chemistry and more particularly coatings involving fluorinated organosilane polymers, since silane polymers are generally known to provide coatings with improved scratch and mar resistance and resistance to etching from acid rain and other environmental pollutants, as shown, for example, in U.S. Pat. No. 4,043,953; U.S. Pat. No. 4,518,726; and U.S. Pat. No. 4,368,397. More particularly, this invention provides a method for obtaining recoat adhesion when repairing a finish having a topcoat comprising a cured or at least partially cured fluorinated silane polymer. The method is especially useful for in-line and end-of-line repair of an original finish on the exterior of automobile and truck bodies or parts thereof. This method involves incorporating in the original topcoat an adhesion improving additive comprising a fluorinated urethane compound and applying thereover a repair basecoat which employs an aminoplast resin crosslinking agent.

Typically, an automobile steel panel or substrate is first coated with an inorganic rust-proofing zinc or iron phosphate layer over which is provided a primer which can be an electrocoated primer or a repair primer. A typical electrocoated primer comprises a cathodically deposited epoxy modified resin. A typical repair primer comprises an alkyd resin. Optionally, a primer surfacer can be applied over the primer coating to provide for better appearance and/or improved adhesion of the basecoat to the primer coat. A pigmented basecoat or colorcoat is next applied. A typical basecoat comprises a pigment, which may include metallic flakes in the case of a metallic finish, and a polyester or acrylourethane film-forming binder and an aminoplast resin crosslinking agent.

A clear topcoat (clearcoat) may then be applied to the pigmented basecoat (colorcoat). The colorcoat and clearcoat are preferably deposited to have thicknesses of about 0.1-2.5 mils and 1.0-3.0 mils, respectively. In the present invention, the topcoat comprises a fluorinated organosilane polymer.

As indicated above, according to the present invention, for the purpose of repairing an original basecoat/clearcoat finish, the original clearcoat is formulated to contain an adhesion improving additive comprising one or more fluorinated urethane compounds and the repair basecoat contains at least one aminoplast resin crosslinking agent such as those normally used to cure a repair basecoat.

The original topcoat is neither adversely affected nor effectively cured by the inclusion therein of a fluorinated urethane compound of the kind used herein, even though the topcoat sometimes also contains an aminoplast resin crosslinking agent which is reactive with the fluorinated urethane compound. During a normal cure cycle, no substantial reaction occurs, allowing the additive to remain available at the surface to react with the aminoplast crosslinking agent in the repair basecoat.

In commercial application of the present invention, it is most convenient to use the same coating compositions for both the original finishes and the repair finishes, so that only one topcoat and basecoat composition are necessary. Another advantage is that, for in-line repair, the same delivery lines and production cycle can be used for the original compositions and the repair compositions. Hence, the topcoat composition used in the repair finish will contain the fluorinated urethane adhesion improving additive even though it has may have no effect on the recoat adhesion.

The topcoat composition employed in the present invention is a clear coating composition, i.e., containing no pigments or a small amount of transparent pigment. The composition also has a relatively high solids content of about 45-90% by weight of film-forming binder and about 10-55% by weight of an organic carrier which can be a solvent for the binder or a mixture of solvents and non solvent which would form a non aqueous dispersion. Typically, the coating composition contains about 50-80% by weight of the film-forming binder and about 20-50% by weight of the organic solvent carrier. The coating of the present invention is also preferably a low VOC (volatile organic content) coating composition, which means a coating that includes less than 0.6 kilograms of organic solvent per liter (5 pounds per gallon) of the composition as determined under the procedure provided in ASTM D3960.

As indicated above, the film-forming portion of the present topcoat composition, comprising polymeric components, is referred to as the "binder" or "binder solids" and is dissolved, emulsified or otherwise dispersed in an organic solvent or liquid carrier. The binder solids generally include all the normally solid polymeric non-liquid components of the composition. Generally, catalysts, pigments or chemical additives such as stabilizers and adhesion improving additives as used herein are not considered part of the binder solids. Non-binder solids other than pigments usually do not amount to more than about 10% by weight of the composition. In this disclosure, with respect to the present top coat composition, the term binder includes the fluorinated silane polymer, the dispersed polymer, and all other optional film-forming polymers, as described herein below.

The binder employed in the present invention contains about 10-90% by weight, preferably 40-80%, of a film-forming fluorinated organosilane polymer, herein also referred to as a fluorinated silane polymer.

The fluorinated silane polymer portion of the binder typically has a weight average molecular weight of about 500-30,000, preferably about 3,000-10,000. All molecular weights disclosed herein are determined by gel permeation chromatography using a polystyrene standard, unless otherwise noted.

Preferably, the fluorinated silane polymer is the polymerization product of a mixture of monomers of which about 1.5-70%, preferably 5-50%, by weight are ethylenically unsaturated monomers which contain a hydrolysable silane functionality, about 5-98%, preferably about 40-95%, by weight are ethylenically unsaturated non-silane and non-fluorine containing monomers, and about 0.5-25%, preferably about 1-10%, by weight are ethylenically unsaturated monomers which contain a fluorine functionality. An acrylosilane resin having 8% by weight polymerized silane monomer and 1.5% fluoroalkyl monomer has been found to have good acid etch resistance, mar resistance, and cleanability.

Suitable ethylenically unsaturated non-silane and non-fluorine containing monomers used to form the fluorinated silane polymer are alkyl acrylates, alkyl methacrylates and any mixtures thereof, where the alkyl groups have 1-12 carbon atoms, preferably 2-8 carbon atoms. Suitable alkyl methacrylate monomers used to form the fluorinated silane polymer are methyl methacrylate, ethyl methacrylate, propyl methacrylate, butyl methacrylate, isobutyl methacrylate, pentyl methacrylate, hexyl methacrylate, octyl methacrylate, nonyl methacrylate, lauryl methacrylate and the like. Similarly, suitable alkyl acrylate monomers include methyl acrylate, ethyl acrylate, propyl acrylate, butyl acrylate, isobutyl acrylate, pentyl acrylate, hexyl acrylate, octyl acrylate, nonyl acrylate, lauryl acrylate and the like. Cycloaliphatic methacrylates and acrylates also can be used, for example, such as trimethylcyclohexyl methacrylate, trimethylcyclohexyl acrylate, isobornyl methacrylate, isobornyl acrylate, t-butyl cyclohexyl acrylate, or t-butyl cyclohexyl methacrylate. Aryl acrylate and aryl methacrylates also can be used, for example, such as benzyl acrylate and benzyl methacrylate. Of course, mixtures of two or more of the above mentioned monomers are also suitable.

In addition to alkyl acrylates or methacrylates, other non-silane and non-fluorine containing polymerizable monomers, up to about 50% by weight of the polymer, can be used in an acrylosilane polymer for the purpose of achieving the desired physical properties such as hardness, appearance, mar resistance, and the like. Exemplary of such other monomers are styrene, methyl styrene, acrylamide, acrylonitrile, methacrylonitrile, and the like. Hydroxy functional monomers can also, and preferably are, incorporated into the fluorinated silane polymer to produce a polymer having a hydroxy number of 20 to 160. Suitable hydroxy functional monomers are hydroxy alkyl (meth)acrylates meaning hydroxy alkyl acrylates and hydroxy alkyl methacrylates having 1-4 carbon atoms in the alkyl groups such as hydroxy methyl acrylate, hydroxy methyl methacrylate, hydroxy ethyl acrylate, hydroxy ethyl methacrylate, hydroxy propyl methacrylate, hydroxy propyl acrylate, hydroxy butyl acrylate, hydroxy butyl methacrylate and the like. The presence of hydroxy functional monomers enables additional crosslinking to occur between the hydroxy groups and silane moieties on the silane polymer and/or between the hydroxy groups with other crosslinking groups on binder components that may be present in the top coat composition.

Suitable silane containing monomers that can be used to form the fluorinated silane polymer are alkoxy silanes having the following structural

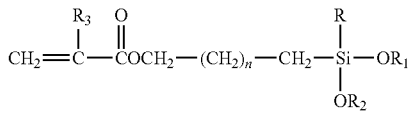

formula:

wherein R is either $CH_3$, $CH_3CH_2$, $CH_3O$, $CH_3OCH_2CH_2O$, or $CH_3CH_2O$; $R_1$ and $R_2$ are independently $CH_3$, $CH_3CH_2$, or $CH_3OCH_2CH_2$; and $R_3$ is either H, $CH_3$, $CH_3CH_2$, or $CH_3OCH_2CH_2$; and n is 0 or a positive integer from 1 to 10. Preferably, R is $CH_3O$ or $CH_3CH_2O$ and n is 1.

Typical examples of such alkoxysilanes are the acrylatoalkoxy silanes, such as gamma-acryloxypropyl trimethoxysilane and the methacrylatoalkoxy silanes, such as gamma-methacryloxypropyl trimethoxysilane, and gamma-methacryloxypropyltris(2-methoxyethoxy) silane.

Other suitable alkoxy silane monomers have the following structural formula:

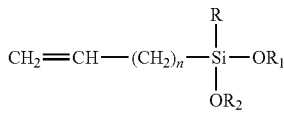

wherein R, $R_1$ and $R_2$ are as described above and n is a positive integer from 1 to 10.

Examples of such alkoxysilanes are the vinylalkoxy silanes, such as vinyltrimethoxy silane, vinyltriethoxy silane and vinyltris(2-methoxyethoxy) silane.

Other suitable silane containing monomers are ethylenically unsaturated acryloxysilanes, including acrylatoxy silane, methacrylatoxy silane and vinylacetoxy silanes, such as vinylmethyldiacetoxy silane, acrylatopropyl triacetoxy silane, and methacrylatopropyltriacetoxy silane. Of course, mixtures of the above-mentioned silane containing monomers are also suitable.

Silane functional macromonomers also can be used in forming the fluorinated silane polymer. For example, one such macromonomer is the reaction product of a silane containing compound, having a reactive group such as epoxide or isocyanate, with an ethylenically unsaturated non-silane containing monomer having a reactive group, typically a hydroxyl or an epoxide group, that is co-reactive with the silane monomer. An example of a useful macromonomer is the reaction product of a hydroxy functional ethylenically unsaturated monomer such as a hydroxyalkyl acrylate or methacrylate having 1-4 carbon atoms in the alkyl group and an isocyanatoalkyl alkoxysilane such as isocyanatopropyl triethoxysilane.

Typical of such above-mentioned silane functional macromonomers are those having the following structural formula:

where R, $R_1$, and $R_2$ are as described above; $R_4$ is H or $CH_3$, $R_5$ is an

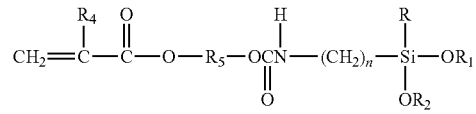

alkylene group having 1-8 carbon atoms and n is a positive integer from 1-8.

The fluorine containing monomers are preferably used in amounts of about 0.5-10% by weight, based on the total weight of the fluorinated silane polymer. Since fluorocarbon monomers are expensive, the present composition preferably has a low content of fluorocarbon constituents. Useful fluorine containing monomers are fluoroalkyl monomers represented by the formula

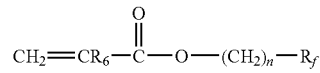

where $R_6$ is hydrogen or an alkyl group having 1-2 carbon atoms, n is an integer of 1-18 and $R_f$ is a fluoroalkyl containing group having at least 4 carbon atoms and preferably a straight chain or branched chain fluoroalkyl group having 4-20 carbon atoms which optionally can contain an oxygen atom.

Typical useful fluoroalkyl containing monomers are perfluoro methyl ethyl methacrylate, perfluoro ethyl ethyl methacrylate, perfluoro butyl ethyl methacrylate, perfluoro pentyl ethyl methacrylate, perfluoro hexyl ethyl methacrylate, perfluoro octyl ethyl methacrylate, perfluoro decyl ethyl methacrylate, perfluoro lauryl ethyl methacrylate, perfluoro stearyl ethyl methacrylate, perfluoro methyl ethyl acrylate, perfluoro ethyl ethyl acrylate, perfluoro butyl ethyl acrylate, perfluoro pentyl ethyl acrylate, perfluoro hexyl ethyl acrylate, perfluoro octyl ethyl acrylate, perfluoro decyl ethyl acrylate, perfluoro lauryl ethyl acrylate, perfluoro stearyl ethyl acrylate, and the like. Preferred are perfluoro alkyl ethyl methacrylates wherein the fluoroalkyl group contains 4-20 carbon atoms.

Other useful fluoroalkyl containing monomers are represented by the formula

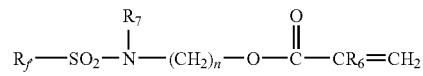

where
$R_6$ is as defined above,
$R_f$ is a fluoroalkyl group having 4-12 carbon atoms,
$R_7$ is an alkyl group having 1-4 carbon atoms and
n is an integer of 1-4.
Typical of these monomers are the following:

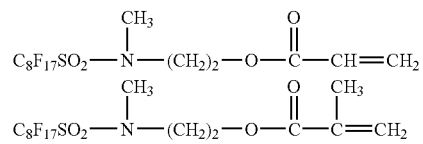

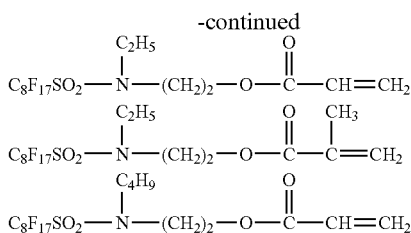

Consistent with the above mentioned components, an example of a fluorinated acrylosilane polymer useful in the top coat composition of this invention may contain the following constituents: about 10-30% by weight styrene, about 2-20% by weight gamma-methacryloxypropyl trimethoxysilane, and about 10-30% by weight isobutyl methacrylate, 5-30% by weight 2-ethyl hexyl acrylate, 15-45% by weight hydroxy ethyl methacrylate and about 0.5-5% by weight fluoroalkyl ethyl methacrylate having 4-20 atoms in the alkyl group.

One particularly preferred fluorinated acrylosilane polymer contains about 20% by weight styrene, about 8% by weight gamma-methacryloxypropyl trimethoxysilane, about 70.5% by weight of nonfunctional acrylates or methacrylates such as trimethylcyclohexyl methacrylate, butyl acrylate, and iso-butyl methacrylate and any mixtures thereof, and about 1.5% by weight of the above fluoroalkyl ethyl methacrylate monomer.

The fluorinated silane polymer used in the coating composition is preferably prepared by conventional polymerization techniques in which the monomers, solvent, and polymerization initiator are charged over a 1-24 hour period of time, preferably in a 2-8 hour time period, into a conventional polymerization reactor in which the constituents are heated to about 60-175° C., preferably about 110-170° C.

In a preferred process for forming the fluorinated silane polymer, the fluoroalkyl containing monomers are not added over an extended period of time with the other monomers but at any time during the polymerization process such as the beginning, end or middle. The polymerizable fluoroalkyl containing monomers usually are blended with solvent and then added to the reactor. The fluoroalkyl containing monomers are added in about 0.01-10% of the total time of polymerization of the polymer. Preferably, the fluoroalkyl containing monomers are added after at least some of the other monomers have been added and polymerized to some extent. The addition of the fluoroalkyl containing monomers in the above manner, typically as a shot towards the end of the polymerization reaction, is a way of making a certain percentage of the polymer chains high in fluorine content without using large amounts of expensive fluorine monomers. This allows one to achieve high cleanability while offering substantial cost savings. It is also beneficial to add a portion of the other functional monomers, for instance, the silane containing—and hydroxyl containing—monomers, typically as a shot towards the end of the polymerization reaction, to provide chains not only rich in fluorine content, but also rich in other functional groups, such as the crosslinkable groups, to achieve other desired film properties, such as high scratch and mar resistance and excellent adhesion to windshield sealants. This technique is also a way of increasing the lifetime of the fluorine surface, since it allows at least a portion of the fluorine groups to become crosslinked through the other functional groups into the final film network, which prevents the fluorine groups from slowly washing away and ultimately disappearing from the surface of the coating film.

Typical polymerization initiators that are used in the process are azo type initiators such as azo-bis-isobutyronitrile, 1,1'-azo-bis(cyanocyclohexane), peroxy acetates such as t-butyl peracetate, peroxides such as di-t-butyl peroxide, benzoates such as t-butyl perbenzoate, octoates such as t-butyl peroctoate and the like.

Typical solvents that can be used in the process are alcohols such as methanol, ethanol, n-butanol, n-propanol, and isopropanol, ketones such as methyl amyl ketone, methyl isobutyl ketone, methyl ethyl ketone, aromatic hydrocarbons such as toluene, xylene, Solvesso® 100, alkylene carbonates such as propylene carbonate, n-methylpyrrolidone, ethers, esters, acetates and mixture of any of the above.

Additional to the fluorinated silane polymer, other film-forming and/or crosslinking solution polymers may be included in the present application. Examples include conventionally known acrylosilanes, acrylics, cellulosics, aminoplasts, isocyanates, urethanes, polyesters, epoxies or mixtures thereof. One preferred optional film-forming polymer is a polyol, for example an acrylic polyol solution polymer of polymerized monomers. Such monomers may include any of the aforementioned alkyl acrylates and/or methacrylates and in addition, hydroxy alkyl acrylates and/or methacrylates. Suitable alkyl acrylates and methacrylates have 1-12 carbon atoms in the alkyl groups. The polyol polymer preferably has a hydroxyl number of about 50-200 and a weight average molecular weight of about 1,000-200,000 and preferably about 1,000-20,000.

To provide the hydroxy functionality in the polyol, up to about 90% preferably 20 to 50%, by weight of the polyol comprises hydroxy functional polymerized monomers. Suitable monomers include hydroxy alkyl acrylates and methacrylates, for example, such as the hydroxy alkyl acrylates and methacrylates listed hereinabove and mixtures thereof. Other polymerizable non-hydroxy-containing monomers may be included in the polyol polymer component, in an amount up to about 90% by weight, preferably 50 to 80%. Such polymerizable monomers include, for example, styrene, methylstyrene, acrylamide, acrylonitrile, methacrylonitrile, methacrylamide, methylol methacrylamide, methylol acrylamide, and the like, and mixtures thereof.

One example of an acrylic polyol polymer comprises about 10-20% by weight of styrene, 40-60% by weight of alkyl methacrylate or acrylate having 1-6 carbon atoms in the alkyl group, and 10-50% by weight of hydroxy alkyl acrylate or methacrylate having 1-4 carbon atoms in the alkyl group. One such polymer contains about 15% by weight styrene, about 29% by weight iso-butyl methacrylate, about 20% by weight 2-ethylhexyl acrylate, and about 36% by weight hydroxy propylacrylate.

In addition to the above components, a dispersed polymer may optionally be included in the coating composition. Polymers dispersed in an organic (substantially non-aqueous) medium have been variously referred to, in the art, as a non-aqueous dispersion (NAD) polymer, a non-aqueous microparticle dispersion, a non-aqueous latex, or a polymer colloid. See generally, Barrett, DISPERSION POLYMERIZATION IN ORGANIC MEDIA (John Wiley 1975). See also U.S. Pat. Nos. 4,147,688; 4,180,489; 4,075,141; 4,415,681; and 4,591,533, hereby incorporated by reference. In general, a dispersed polymer is characterized as a polymer particle dispersed in an organic media, which particle is stabilized by steric stabilization accomplished by the attachment of a solvated polymeric or oligomeric layer at the particle-medium interface. The dispersed polymers are used in the present invention to solve the problem of cracking heretofore associated with silane coatings. Suitable dispersed polymers for use in conjunction with silane polymers are disclosed in U.S. Pat. No. 5,162,426, hereby incorporated by reference in its entirety. Preferably, about 20% by weight of such a dispersed polymer is included to prevent cracking.

For a two-component or two-package system, which is generally preferred, a polyfunctional organic isocyanate can be used as the crosslinking agent without particular limitation so long as the isocyanate compound has at least two isocyanate groups in the one molecule. The preferable polyisocyanate compounds are isocyanate compounds having 2 to 3 isocyanate groups per molecule. Typical examples of polyfunctional organic isocyanate compounds are, for instance, 1,6-hexamethylene diisocyanate, isophorone diisocyanate, 2,4-toluene diisocyanate, diphenylmethane-4,4'-diisocyanate, dicyclohexylmethane-4,4'-diisocyanate, tetramethylxylidene diisocyanate, and the like. Trimers of diisocyanates also can be used such as the trimer of hexamethylene diisocyanate (isocyanurate) which is sold under the tradename Desmodur® N-3390, the trimer of isophorone diisocyanate (isocyanurate) which is sold under the tradename Desmodur® Z-4470 and the like. Polyisocyanate functional adducts can also be used that are formed from any of the forgoing organic polyisocyanate and a polyol. Polyols such as trimethylol alkanes like trimethylol propane or ethane can be used. One useful adduct is the reaction product of tetramethylxylidene diisocyanate and trimtheylol propane and is sold under the tradename of Cythane® 3160. When the crosslinkable resin of the present invention is used in exterior coatings, the use of an aliphatic or cycloaliphatic isocyanate is preferable to the use of an aromatic isocyanate, from the viewpoint of weatherability and yellowing resistance.

Optionally, the present coating composition may further include, particularly in conjunction with an optional polyol polymer, an additional crosslinking agent, for example, an aminoplast crosslinking agent. Particularly preferred aminoplast resins are any of the conventionally used alkylated melamine formaldehyde crosslinking agents. Typically useful alkylated melamine formaldehyde crosslinking agents are, for example, conventional monomeric or polymeric alkylated melamine formaldehyde resin that are partially or fully alkylated. One useful crosslinking agent is a methylated and butylated or isobutylated melamine formaldehyde resin that has a degree of polymerization of about 1-3. Generally, this melamine formaldehyde resin contains about 50% butylated groups or isobutylated groups and 50% methylated groups. Such crosslinking agents typically have a number average molecular weight of about 300-600 and a weight average molecular weight of about 500-1500. Examples of commercially available resins are Cymel® 1168, Cymel® 1161, Cymel® 1158, Resimine® 4514 and Resimine® 354. Preferably, the crosslinking agent is used in the amount of about 5-50% by weight, based on the weight of the binder. Other contemplated crosslinking agents are urea formaldehyde, benzoquanamine formaldehyde and blocked polyisocyanates or compatible mixtures of any of the forgoing crosslinkers. Preferably about 10-60% by weight of such crosslinking agent in included in the binder of the coating.

The clear coat composition described above can also be formulated (minus the unblocked organic polyisocyanate) as a one-package system that has extended shelf life.

A catalyst is typically added to catalyze the crosslinking of the silane moieties of the silane polymer with itself and/or with other components of the composition. A wide variety of catalysts can be used, such as dibutyl tin dilaurate, dibutyl tin dilaurate, dibutyl tin diacetate, dibutyl tin dioxide, dibutyl tin dioctoate, tin octoate, aluminum titanate, aluminum chelates, zirconium chelate and the like. Sulfonic acids, such as dodecylbenzene sulfonic acid, either blocked or unblocked, are effective catalysts. Alkyl acid phosphates, such as phenyl acid phosphate, either blocked or unblocked, may also be employed. Any mixture of the aforementioned catalysts may be useful, as well. Other useful catalysts will readily occur to one skilled in the art. Preferably, the catalysts are used in the amount of about 0.1 to 5.0%, based on the total weight of the binder used in the composition.

A key component of the coating composition of the present invention is, in addition to the above components, an adhesion improving additive, also referred to herein as an adhesion promoter or a recoat adhesion improving additive. An effective adhesion enhancing amount of adhesion improving additive is added to the top coat composition to solve the recoat adhesion problem mentioned above. The adhesion improving additive of this invention also provides the top coat composition with excellent primeness adhesion to commercially available moisture-cure windshield bonding adhesives, which are needed to properly affix a windshield to the body of a vehicle. The adhesion improving additive is typically added to the topcoat composition in an adhesion enhancing amount ranging from about 0.1 to 15% by weight, preferably from about 5-10% by weight, based on the total weight of the binder used in the composition.

More particularly, the adhesion improving additive used herein is a fluorinated urethane compound which is an polyisocyanate-derived adduct of a conventional organic polyisocyanate, a fluorinated monofunctional alcohol, and an oligomeric or polymeric ethoxylated/propoxylated glycol, and contains no residual or free —NCO groups. The fluorinated urethane additive also is preferably substantially free of residual hydroxyl groups capable of reacting with the film-forming binder components in the topcoat composition, to prevent the additive from becoming a permanent part of the paint film. The additive thereby can remain an unreacted mobile component in the paint film which is preferred.

While not wishing to be bound by any particular theory, it is surmised that the fluorinated urethane additive migrates to the surface of the film during curing and since urethane groups (i.e., carbamate groups) are capable of reacting with melamine groups, there is enough intermixing at the interface so that repair basecoat containing melamine will react with the urethane groups in the original topcoat and result in improved recoat adhesion.

Preferably, the fluorinated urethane adduct of the present invention is formed from a conventional organic polyisocyanate resin which is reacted with a fluorinated monoalcohol and further reacted with a polyether polyol to provide an adduct with reactive carbamate groups that can subsequently react with an aminoplast resin present in a repair basecoat.

The organic polyisocyanates that may be used to form the adduct can be any conventional aromatic, aliphatic, cycloaliphatic di and trifunctional polyisocyanates can be used, such as any of the organic polysiocyanates listed above. Typical diisocyanates that can be used include any of those listed hereinabove including 1,6-hexamethylene diisocyanate, isophorone diisocyanate, 4,4'-biphenylene diisocyanate, toluene diisocyanate, bis cyclohexyl diisocyanate, tetramethylene xylene diisocyanate, ethyl ethylene diisocyanate, 2,3-dimethyl ethylene diisocyanate, 1-methyltrimethylene diisocyanate, 1,3-cyclopentylene diisocyanate, 1,4-cyclohexylene diisocyanate, 1,3-phenylene diisocyanate, 1,5-naphthalene diisocyanate, bis-(4-isocyanatocyclohexyl)-methane, 4,4'-diisocyanatodiphenyl ether and the like. Typical trifunctional isocyanates that can be used are any of those listed hereinabove including triphenylmethane triisocyanate, 1,3,5-benzene triisocyanate, 2,4,5-toluene triisocyanate and the like. Oligomers of diisocyanates also can be used such as the trimer of hexamethylene diisocyanate (isocyanurate) which is sold under the tradename Desmodur® N. One particularly preferred oligomer is Desmodur® N-3390. Also suitable are any other polyisocyanates which contain carbodiimide groups, urethane groups, allophanate groups, isocyanurate groups, biuret groups, and urea groups.

The organic polyisocyanate can be reacted with, for example, any fluorinated monofunctional alcohol. Suitable fluorinated monofunctional alcohols are represented by the formula

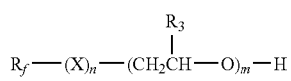

where $R_f$ is as defined above, a fluoroalkyl containing group having at least 4 carbon atoms and preferably a straight chain or branched chain fluoroalkyl group having 4-20 carbon atoms which optionally can contain oxygen atoms as ether groups or can contain 1-5 chlorine atoms or 1-5 hydrogen atoms. Preferably, $R_f$ is a perfluoroalkyl group having 4-20 carbon atoms and most preferably, $R_f$ is a perfluoroalkyl group containing 6-12 carbon atoms. X is a divalent radical, preferably —CH$_2$CH$_2$O—, —SO$_2$N(R$^4$)CH$_2$CH$_2$O—, —CH$_2$—, —O—, —CH$_2$O— where R$^4$ is an alkyl group preferably having 1-4 carbon atoms. R$^3$ is H or an alkyl group having 1-4 carbon atoms, H and methyl being preferred, n is 0-1 and m is 0-30, provided that if n is 0, then m must be greater than or equal to 1, if m is 0, then n is 1; if X is —O—, m must be greater than or equal to 1; and m preferably 1-20.

The following are preferred fluorinated monofunctional alcohols:

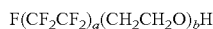

where a is 1 to about 8, or a mixture thereof, and preferably is from about 3 to about 6, and b is 5-15;

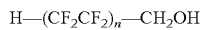

where n is 1-6;

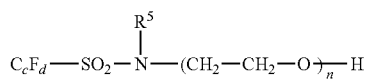

where c is 4-8 and d is 2c+1; R$^5$ is an alkyl group having 1-4 carbon atoms and n is 1-30;

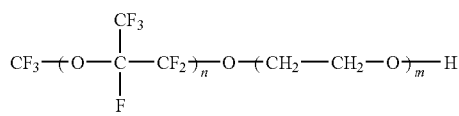

where n is 0-10 and m is 1-20; and

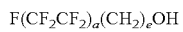

where a is described above and e is from about 2 to about 10, and preferably is 2.

Specific examples of such fluorinated monoalcohols are sold under the tradename ZONYL® BA, BA-L, BA-N or BA-LD Fluoroalcohols. Zonyl® Fluoroalcohols are mixtures of alcohols of formula F(CF$_2$CF$_2$)$_{2-8}$CH$_2$CH$_2$OH available from E.I. du Pont de Nemours and Company, Wilmington, Del.

Polyether polyols are used to cap, i.e., react with the residual isocyanate end groups, to form the fluorinated urethane additive. Preferred polyols are oligomeric or polymeric ethoxylated/propoxylated glycol or a combinations of these glycols. Suitable ethoxylated/propoxylated glycols include polyoxyethylene glycol and polyoxyethylene-polyoxypropylene glycol of the general formula

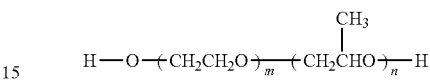

where m and n are the average number of repeating oxyethylene (EO) and oxypropylene (PO) groups, respectively; provided that m is always a positive integer, while n is a positive integer or zero (designating an EO homopolymer in the latter case).

The EO/PO glycols used herein preferably are oligomeric materials that have a weight average molecular weight of from about 500 to about 5,000, preferably about 980 to about 2,500. Typical examples of such polyoxyethylene-polyoxypropylene glycols are available under the tradename "Ucon 75-H", from Union Carbide. "Ucon 75-H Series" EO/PO glycols are linear copolymers having 75% by weight oxyethylene (EO) groups and 25% by weight oxypropylene (PO) groups and have molecular weights within the range mentioned above. The only side chains on the essentially linear copolymer are due to the methyl groups of the oxyproylene residue. One particularly preferred EO/PO glycol is "Ucon-75-H-450" which has a weight molecular weight of about 980 and a viscosity at 37.8° C. of 450 sus.

In the present invention, it is believed that the fluorochemical portion of the additive provides additional water and oil repellency and soil resistance to the topcoat, while the EO/PO glycol portion imparts water solubility to the additive and therefore solubility in a typical basecoat composition. By suitable choice of the EO/PO groups, the diffusion rate of the fluorinated additive into the basecoat can be predictably controlled.

The fluorinated urethane additive can be, and preferably is, prepared by conventional polymerization techniques using a simultaneous or stepwise procedure. In a preferred embodiment, a stepwise procedure is employed. In this embodiment, the polyisocyanate is reacted first with the fluorinated monofunctional alcohol to make sure that fluorine functionality is included in the adduct. The fluorinated isocyanate intermediate is then capped with the polyether glycol to provide the fluorinated urethane adduct having no residual isocyanate groups.

Step one thus entails reacting the organic polyisocyanate with the fluorinated mono-alcohol. Typically, the constituents are reacted with a catalyst such as dibutyl tin dilaurate for about 0.1-4 hours at temperatures of about 45-120° C. in an inert solvent to form the intermediate. The amount of monoalcohol reacted with the polyisocyanate in step one should be one stoichiometric equivalent or less per equivalent of isocyanate. Preferably, the amount of monoalcohol employed is not less than about 0.45 of an equivalent per equivalent of isocyanate, more preferable form about 0.50 to 1.0 of monoalcohol to isocyanate equivalent.

In step two, the EO/PO glycol is reacted with the fluorinated polyisocyanate intermediate made in the first step. The amount of EO/PO glycol employed is typically 5-15% in excess of one stoichiometric equivalent sufficient to consume about 99%, preferably 100% of the isocyanate functionality without leaving any of the remaining isocyanate reactive functionality in the resulting polyisocyanate derived adduct.

Reaction of the glycol with the fluorinated isocyanate intermediate can be monitored by isocyanate absorbance band by using a Fourier transform infrared spectrometer and isocyanate titration. The reaction end point is achieved when no isocyanate functionality remains in the resulting polyisocyanate derived adduct.

Although in principle, it is intended that all of the isocyanate functionality of the polyisocyanate be reacted it should be understood that 100 percent complete reaction cannot always be attained, and therefore, trace amounts of unreacted isocyanate and/or unreacted hydroxyls can be expected. Alternatively, reacting "all" of the isocyanate for the purposes of the present invention may be defined as at least 99 percent complete reaction, preferably 100 percent.

One particularly preferred fluorinated urethane adduct is the reaction product of isophorone diisocyanate reacted with one equivalent of Zonyl® BA fluoroalcohol and then capped with one equivalent of Ucon® 75-H-450.

In another embodiment, the adhesion improving additive may contain additional hydrolyzable silane functionality, in order to improve the adhesion of the cured or at least partially cured topcoat composition to commercially available moisture-cure urethane windshield sealants used to affix a windshield to a vehicle. To provide hydrolyzable silane functionality in the additive, the polyether polyols, which are used to cap the isocyanate groups, may be replaced with an amino-functional silane. The additive may be prepared in the same manner as described above, except for the change in the cap.

Amino-functional silanes that can be used to form this fluorourethane silane additive are represented by the formula

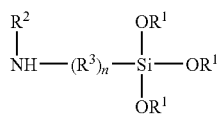

where $R^1$ is independently $C_1$-$C_{16}$ alkyl, $R^2$ is independently H or $C_1$-$C_{12}$ alkyl, and $R^3$ is a moiety independently selected from the group consisting of alkylene, cycloalkylene, heterocyclic, arylene, alkoxylene, aralkylene, alkenylene and low molecular weight polymer moiety, and n is an integer from 1 to 16. Preferred for $R^1$ are alkyls of $C_1$ to $C_4$, most preferably $C_1$ to $C_2$. Alkyl substituents can be linear or cyclic and the amine function can be primary or secondary. Representative low molecular weight polymer values for $R^3$ are polyester, polyurethane, polyether, polyamine and the like. By "low molecular weight" it is meant no more than about 3000 (number average). When $R^3$ are low molecular weight polymers, n is 1. Preferably, however, for $R^3$ are alkylene groups containing 2 to 20 carbon atoms and n is 1 to 3.

The following are preferred amino-functional silanes:

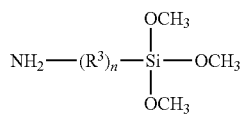

where $R^3$ is an alkylene group containing 1 to 20 carbon atoms, more preferably 1 to 2 carbon atoms, and n is 1 to 3.

Specific examples of such amino functional silanes that are commercially available are 3-aminopropyl trimethoxy silane and analogs thereof, such as where the trimethoxysilane group is replaced by various combinations of methyldialkoxysilane groups.

It is believed that fluorochemical portion of this additive provides additional water and oil repellency and soil resistance to the topcoat, while the aminosilane portion imparts water solubility to the additive and therefore solubility in a typical basecoat composition as well as improved adhesion without a primer to windshield sealants. By suitable choice of amino groups, the diffusion rate of the fluorinated additive into the basecoat can also be predictably controlled.

In addition to the above components, to improve the weatherability of the clear finish made with the topcoat composition, an ultraviolet light stabilizer or a combination of ultraviolet light stabilizers can be added to the topcoat composition in the amount of about 0.1-10% by weight, based on the weight of the binder. Such stabilizers include ultraviolet light absorbers, screeners, quenchers, and specific hindered amine light stabilizers. Also, an antioxidant can be added, in the amount of about 0.1-5% by weight, based on the weight of the binder. Typical ultraviolet light stabilizers that are useful include benzophenones, triazoles, triazines, benzoates, hindered amines and mixtures thereof.

A suitable amount of water scavenger such as trimethyl orthoacetate, triethyl orthoformate, tetrasilicate and the like (preferably 2 to 6% by weight of binder) is typically added to the topcoat composition for extending its pot life. About 3% microgel (preferably acrylic) and 1% hydrophobic silica may be employed for rheology control. The composition may also include other conventional formulation additives such as flow control agents, for example, such as Resiflow® S (polybutylacrylate), BYK® 320 and 325 (high molecular weight polyacrylates).

Small amounts of pigment can also be added to the topcoat composition to eliminate undesirable color in the finish such as yellowing.

According to the present method, when the repair basecoat is applied over the original topcoat described above, recoat adhesion can now be attained. In general, the composition of the basecoat is not limited by the present invention except to the extent that it must contain an aminoplast resin crosslinking agent. Preferred basecoats comprise a polyester or polyester urethane in combination with a melamine crosslinking agent and a polyol. Suitable polyols include acrylic, polyester, polyester urethane, or an acrylic urethane polyol having a hydroxy number of 60-160. Such polyols may contribute to recoat adhesion over a silane clearcoat by hydroxy groups on the polyol reacting with some of the unreacted or residual silane groups in the clearcoat even though the topcoat has substantially or partially cured. An example of a suitable basecoat, in addition to pigments, aluminum flakes, and UV absorber, comprises by weight of composition, about 25% microgel for rheology control, 21% melamine formaldeyde resin, 17% branched polyester resin, 3% acrylourethane having a hydroxy number of 120, 2% blocked dibutyl dodecyl benzyl sulfonic acid catalyst, and 2% dibutyl diacetate.

Additional film-forming and/or crosslinking polymers may be included in the basecoat employed in the present invention. Examples include conventionally known acrylics, cellulosics, aminoplasts, urethanes, polyesters, epoxides or mixtures thereof. One example of an additional optional acrylic polymer is an acrylic polyol solution polymer. Such polyols preferably have a hydroxyl number of about 50-200 and a weight average molecular weight of about 1,000-200,000 and preferably about 1,000-20,000. A preferred polyol is comprised by weight of 25% styrene, 31% butyl methacrylate, 17% butyl acrylate and 38% hydroxy propyl acrylate and has a Tg of 18.5° C.

Although not wishing to be bound by theory, it is surmised that the presence of the fluorinated urethane additive in the original topcoat may cause the reaction of the aminoplast resin in the repair basecoat with the urethane groups in the clearcoat to form carbamate bonds which promote adhesion between the original clearcoat and repair basecoat interface.

A variety of pigments and metallic flakes may be employed in the basecoat, as would be apparent to those skilled in the art. Typical pigments in the basecoat composition include the following: metallic oxides such as titanium dioxide, zinc oxide, iron oxides of various colors, carbon black, filler pigments such as talc, china clay, barytes, carbonates, silicates and a wide variety of organic colored pigments such as quinacridones, copper phthalocyanines, perylenes, azo pigments, indanthrone blues, carbazoles such as carbozole violet, isoindolinones, isoindolones, thioindigo reds, benzimidazolinones, metallic flake pigments such as aluminum flake, pearlescent flakes, and the like.

The pigments can be introduced into the basecoat by first forming a mill base or pigment dispersion with any of the aforementioned polymers used in the coating composition or with another compatible polymer or dispersant by conventional techniques, such as high speed mixing, sand grinding, ball milling, attritor grinding or two roll milling. The mill base is then blended with the other constituents used in the coating composition.

The basecoat compositions employed in the present invention may also include other conventional formulation additives such as flow control agents, for example, such as Resiflow® S (polybutylacrylate), BYK®320 and 325 (high molecular weight polyacrylates); and rheology control agents, such as fumed silica.

In both the basecoat and topcoat employed in this invention, conventional solvents and diluents are also generally used to disperse and/or dilute the above mentioned polymers. Typical solvents and diluents include toluene, xylene, butyl acetate, acetone, methyl isobutyl ketone, methyl ethyl ketone, methanol, isopropanol, butanol, hexane, acetone, ethylene glycol, monoethyl ether, VM and P naptha, mineral spirits, heptane and other aliphatic, cycloaliphatic, aromatic hydrocarbons, esters, ethers and ketones and the like. In a typical basecoat, water is typically used as a cosolvent, since most basecoats used nowadays are waterborne systems.

According to the present invention, any of the coating compositions can be applied by conventional techniques such as spraying, electrostatic spraying, dipping, brushing, flow-coating and the like. The preferred techniques are spraying and electrostatic spraying. After application, a coating composition is typically baked at 100-150° C. for about 15-30 minutes to form a coating about 0.1-3.0 mils thick. When a composition is used as a clearcoat, it is applied over the colorcoat which may be dried to a tack-free state and cured or preferably flash dried for a short period before the clearcoat is applied. The colorcoat/clearcoat finish may then be baked as mentioned above to provide a dried and cured finish.

It has become customary, particularly in the auto industry, to apply a clear topcoat over a basecoat by means of a "wet-on-wet" application, i.e., the topcoat is applied to the basecoat without curing or completely drying the basecoat. The coated substrate is then heated for a predetermined time period to allow simultaneous curing of the base and clear coats.

Upon curing of clear topcoat compositions of the present invention, a portion of the fluorinated silane-containing polymer may also preferentially migrate to, and stratify within, the top portion of the clearcoat, particularly when the fluorinated organosilane polymer is used in combination with a polyol, so as to produce a durable, weather-resistant clearcoat. Such stratification is also generally desirable, since it contributes to very low surface energy, high water and oil repellency, and hence outstanding stain resistance and cleanability, by virtue of the presence of the fluorocarbon constituents. Such stratification has been shown by electron scanning chemical analysis (ESCA) of a cross section of the cured layer of topcoat.

The coating compositions of this invention when applied to a substrate and fully cured most desirably have a water advancing contact angle at least 1000, preferably 100°-120° and a hexadecane advancing angle of at least 400, preferably 45-85° and more preferably 60°-85°, which provides for a finish, as discussed above, that remains relatively dirt free and easily washed or wiped clean. The relationship between water and organic liquid contact angles and cleanability and dirt retention is more fully described below in the Examples.

In another embodiment, the composition of this invention can be pigmented and used as the colorcoat, or as a monocoat or even as a primer or primer surfacer. When used as a monocoat, these compositions are especially useful for aviation, farm and construction equipment, and architectural coatings where improved cleanability is also desired. When the present coating composition is used as a basecoat, monocoat, primer or primer surfacer, the pigments can be introduced into the coating composition by first forming a mill base or pigment dispersion with any of the aforementioned polymers used in the coating composition or with another compatible polymer or dispersant by conventional techniques, such as high speed mixing, sand grinding, ball milling, attritor grinding or two roll milling. The mill base is then blended with the other constituents used in the coating composition. Conventional solvents and diluents are used to disperse and/or dilute the above mentioned polymers to obtain the pigmented coating composition.

In still another embodiment of the present invention, the fluorinated urethane additive described above may be effective as a "mix-in" polymer or additive (typically in the amount from about 0.1-15% by weight, based on the weight of the binder) to any commercially available coating system. For example, the fluorourethane can be used as an additive in polishes, waxes, paints, varnishes and architectural coatings for improved cleanability and stain-resistance. The fluorourethane can be used as an additive for hard flooring to provide enhanced cleanability. The fluorourethane can also be used to improve cleanability and stain-resistance to coatings for appliances, range hoods, auto wheels, etc.

EXAMPLES

The following Examples illustrate the invention. All parts and percentages are on a weight basis unless otherwise indicated. All molecular weights disclosed herein are determined by GPC using a polystyrene standard.

The following oligomers and polymers were prepared and used as indicated in Example 1 and Comparative Examples 2 and 3.

Preparation of Fluorinated Acrylosilane Polymer

A fluorinated acrylosilane polymer was prepared by charging the following constituents into a nitrogen blanketed 12-liter reaction flask equipped with an agitator, thermocouple, a reflux condenser, and heating mantle:

| Ingredients | Parts by Weight |
|---|---|
| Portion I | |
| Aromatic solvent (Solvesso ® 100 from Exxon) | 1049.8 |
| n-Butanol | 524.9 |
| Portion II | |
| Styrene | 923.8 |
| 2-Ethylhexyl acrylate | 706.7 |
| Hydroxyethyl methacrylate | 1340 |
| Isobutyl methacrylate (iBMA) | 1071.6 |
| Gamma-methacryloxypropyl trimethoxysilane (Silquest ® A-174 from Crompton) | 231 |
| 2,2'-azobis(2-methylbutyronitrile) (Vazo ® 67 from DuPont) | 332.6 |
| Aromatic solvent (Solvesso ® 100 from Exxon) | 1417.2 |
| n-Butanol | 182.7 |
| Portion III | |
| 1,1,2,2 Perfluoroalkyl ethyl methacrylate (Zonyl TM ® from DuPont; mixed perfluoroalkylethylmethacrylates of formula $F(CF_2CF_2)_{3-8}CH_2CH_2OC(O)C(CH_3)\!\!=\!\!CH_2$) | 69.3 |
| 2,2'-azobis(2-methylbutyronitrile) (Vazo ® 67 from DuPont) | 32.3 |
| Gamma-methacryloxypropyl trimethoxysilane (Silquest ® A-174 from Crompton) | 138.6 |
| Hydroxyethyl methacrylate | 138.6 |
| Aromatic solvent (Solvesso ® 100 from Exxon) | 69.3 |
| Portion IV | |
| 2,2'-azobis(2-methylbutyronitrile) (Vazo ® 67 from DuPont) | 36.9 |
| Aromatic solvent (Solvesso ® 100 from Exxon) | 105.0 |
| n-Butanol | 52.4 |
| Total | 8422.8 |

Portion I was charged into the reaction flask and heated to its reflux temperature under agitation. Portion II was premixed and then added thereto over a 240 minute period while maintaining the reaction mixture at the reflux temperature. Portion III was premixed and then added at one time to the reaction mixture 230 minutes after the start of the addition of Portion II. After completion of the 240 minute feed, Portion IV that had been premixed was added over a 30 minute period and then the reaction mixture was held at its reflux for an additional 60 minutes. The resulting polymer solution was then cooled to room temperature.

The resulting polymer solution had a weight solids of 56.7%, Gardner-Holdt viscosity measured at 25° C. of J, a number average molecular weight of about 2,175 and a polydispersity of 1.9, and contains the following constituents Sty/2-EHA/iBMA/A-174/HEMA II Zonyl TM® (shot)/A174(shot)/HEMA(shot) in a weight ratio of 20/15/23.5/5/29//1.5/3/3.

Preparation of Fluorinated Urethane Additive

A fluoro-urethane additive was prepared by charging the following constituents into a nitrogen blanketed 500-mililiter reaction flask equipped as above:

| | Parts by Weight |
|---|---|
| Portion I | |
| Isophorone Diisocyanate (Desmodur ® I from Bayer) | 44.44 |
| Methyl isobutyl ketone | 60.32 |
| 1,1,2,2,-Tetrahydroperfluoro alcohol {or Perfluoroalkylethyl alcohol} (Zonyl BA ® from DuPont; mixed fluoroalcohols of formula $F(CF_2CF_2)_{2-8}CH_2CH_2OH$) | 95.91 |
| Portion II | |
| Dibutyltin dilaurate | 0.04 |
| Portion III | |
| Polyalkylene Glycol (Ucon ® 75-H-450 from Dow Chemical; Polyalkylene group contains 75 weight % oxyethylene and 25 weight % oxypropylene groups; number average molecular weight 980) | 205.8 |
| Total | 406.51 |

The ingredients of Portion I were charged into the reaction flask in the order given and heated to 46° C. under agitation and a nitrogen blanket. Portions II was then added to Portion I, a slight exotherm was observed, and the solution was held at 46° C. with stirring for 2 hours. Then, Portion III was added over a 30 minute period and the solution was held at 75° C. for 2 hours and then cooled to room temperature giving a 96% yield of fluorinated urethane additive solution.

The resulting fluorinated urethane additive solution has a 82.6% solids content.

Preparation of Fluorinated Urethane Additive with Silane Functionality

A fluoro-urethane additive with silane functionality was prepared by charging the following constituents into a nitrogen blanketed 2-liter reaction flask equipped as above:

| | Parts by Weight |
|---|---|
| Portion I | |
| Isophorone Diisocyanate (Desmodur ® I from Bayer) | 44.4 g |
| Methyl isobutyl ketone | 60 g |
| 1,1,2,2,-Tetrahydroperfluoro alcohol {or Perfluoroalkylethyl alcohol}(Zonyl BA ® from DuPont; mixed fluoroalcohols of formula $F(CF_2CF_2)_{2-8}CH_2CH_2OH$) | 95.8 g |
| Portion II | |
| Dibutyltin dilaurate | 0.11 g |
| Portion III | |
| 3-Aminopropyl trimethoxysilane | 37.6 g |
| Total | 237.91 |

The ingredients of Portion I were charged into the reaction flask in the order given and heated to reflux temperature under agitation and a nitrogen blanket. Portion II was then added to Portion I, and the solution was held at 45-50° C. with stirring for 3 hours. Then, Portion III was added over a 120 minute period, at a solution temperature of 75° C. The solution was held until the NCO peak as monitored by Infra Red Spectroscopy disappeared.

Preparation of Non-Fluorinated Acrylosilane Resin

For comparative purposes, a non-fluorinated hydroxy functional acrylosilane resin was prepared by charging the following to a nitrogen blanketed flask equipped as above:

|  | Parts by Weight |
|---|---|
| Portion I | |
| Aromatic solvent (Solvesso ® 100 from Exxon) | 96.8 |
| n-Butanol | 44.9 |
| Portion II | |
| Styrene | 98.9 |
| Hydroxyethyl methacrylate | 155.8 |
| Isobutyl methacrylate | 128.1 |
| 2-Ethyl hexyl acrylate | 62.3 |
| gamma-Methacryloxypropyl trimethoxysilane (Silquest ® A-174 from Crompton Corp.) | 49.5 |
| Aromatic solvent (Solvesso ® 100 from Exxon) | 18.3 |
| Portion III | |
| Aromatic solvent (Solvesso ® 100 from Exxon) | 64.3 |
| n-Butanol | 68.8 |
| 2,2'-azobis(2-methylbutyronitrile) (Vazo ® 67 from DuPont) | 42.0 |
| Total | 829.7 |

Portion I was charged into the reaction flask and heated to reflux temperature under agitation and a nitrogen blanket. Portions II and III were separately premixed and added to Portion I over a 270 minute period, while the solution was maintained at reflux temperature. The resulting polymer solution was then held at reflux temperature for 30 minutes.

The resulting polymer solution has a 64% solids content, a T viscosity as measured on a Gardner-Holtz scale, and a weight average molecular weight of about 5,000.

Preparation of Acrylic Polyol Resin

An acrylic polyol resin, which may optionally be included in the composition of the present invention, was prepared by charging the following to a nitrogen blanketed flask equipped as above:

|  | Parts by Weight |
|---|---|
| Portion I | |
| Aromatic solvent (Solvesso ® 100 from Exxon) | 164.5 |
| n-Butyl Acetate | 18.8 |
| Portion II | |
| Hydroxy ethyl acrylate | 174.0 |
| Butyl methacrylate | 233.8 |
| Styrene | 136.0 |
| Aromatic solvent (Solvesso ® 100 from Exxon) | 27.4 |
| n-Butyl Acetate | 3.0 |
| Portion III | |
| 2,2'-azobis(2-methylbutyronitrile) (Vazo ® 67 from DuPont) | 21.7 |
| Aromatic solvent (Solvesso ® 100 from Exxon) | 63.6 |
| n-Butyl Acetate | 12.1 |
| Total | 854.9 |

Portion I was charged into the reactor and heated to reflux temperature. Portions II and III were premixed separately and then added simultaneously to the reactor while the reaction mixture was held at reflux temperature, over a 260 minute period. The solution was then held at reflux temperature for 30 minutes.

The resulting acrylic polyol resin is 66% by weight solids, and has a weight average molecular weight of about 6,000.

Preparation of Acrylic NAD Resin

A hydroxy functional acrylic NAD resin, which may optionally be included in the composition of the present invention, was prepared by charging the following to a nitrogen blanketed flask equipped as above:

|  | Parts by Weight |
|---|---|
| Portion I | |
| Isopropanol | 29.9 |
| Mineral spirits (Exxsol ® D40 from Exxon) | 35.9 |
| Heptane | 245.6 |
| Acrylic polymer solution (60% solids of an acrylic polymer of 15% styrene, 20% butyl methacrylate, 38.5% ethyl hexyl methacrylate, 22.5% hydroxy ethyl acrylate, 4% acrylic acid, and 1.4% glycidyl methacrylate having a weight average molecular weight of 10,000 in a solvent blend of 77.5% Solvesso ® 150 and 22.5% butanol) | 179.7 |
| Portion II | |
| t-Butyl peroxy-2-ethyl hexanoate | 0.45 |
| Portion III | |
| Styrene | 35.9 |
| Methyl methacrylate | 194.7 |
| Acrylonitrile | 6.0 |
| Acrylic polymer solution (from above) | 89.9 |
| Hydroxy ethyl acrylate | 29.9 |
| Methyl acrylate | 15.0 |
| Glycidyl methacrylate | 6.0 |
| Acrylic acid | 12.0 |
| Isobutyl alcohol | 26.9 |
| Portion IV | |
| Mineral spirits (Exxsol ® D40 from Exxon) | 21.0 |
| Heptane | 27.0 |
| t-Butyl peroxy-2-ethyl hexanoate | 3.0 |
| Portion V | |
| Isobutyl alcohol | 42.0 |
| t-Butyl peroxy-2-ethyl hexanoate | 15 |
| Total | 1002.35 |

Portion I was charged into the reaction vessel and heated to reflux temperature. Portion II was then added to the reaction vessel within 5 minutes before Portions III and IV begin feeding into the reaction vessel. Portions III and IV were separately premixed, and simultaneously fed into the reaction vessel, at reflux temperature, over a 210 minute period. Portion V was premixed and added over a 60 minute period while maintaining reflux temperature. The reaction solution was then held at reflux temperature for 60 minutes. Vacuum was then applied to the reaction vessel, and 236.84 parts by weight solvent are stripped off.

The resulting NAD resin has a weight solids of 60%, a core having a weight average molecular weight of about 100,000-200,000 and arms attached to the core having a weight average molecular weight of about 10,000-15,000.

Preparation of an Acrylic Microgel Resin

A methyl methacrylate/glycidyl methacrylate copolymer was prepared as an intermediate stabilizing polymer used in the synthesis of the below acrylic microgel resin, also optionally included in the composition of the present invention. This stabilizing polymer was prepared by charging the following to a nitrogen blanketed flask equipped as above:

|  | Parts by Weight |
|---|---|
| Portion I | |
| n-Butyl acetate | 195.8 |
| Portion II | |
| Methyl methacrylate | 139.0 |
| n-Butyl acetate | 14.4 |
| Glycidyl methacrylate | 13.1 |
| Glycidyl methacrylate/12-Hydroxystearic acid copolymer (60% by weight solids solution of 89.2% 12-HAS/10.8% GMA in a 80/20 blend of toluene and petroleum naphtha) | 181.7 |
| Petroleum Naphtha (Exxsol ® D-3135 from Exxon) | 40.6 |
| n-Butyl acetate | 13.1 |
| Portion III | |
| 2,2'-azobis(2-methylbutyronitrile) | 8.0 |
| n-Butyl acetate | 71.6 |
| Petroleum Naphtha (Exxsol ® D-3135 from Exxon) | 74.3 |
| Portion IV | |
| 4-tert-Butyl catechol | 0.04 |
| n-Butyl acetate | 2.7 |
| Portion V | |
| Methacrylic acid | 2.7 |
| n-Butyl acetate | 6.0 |
| Portion VI | |
| N,N'-dimethyl dodecyl amine | 0.4 |
| n-Butyl acetate | 2.7 |
| Total | 766.14 |

Portion I was charged to the reactor and brought to a temperature of 96 to 100° C. Portions II and III were separately premixed and then added concurrently over a 180 minute period, while maintaining a reaction temperature of 96 to 100° C. The solution was then held for 90 minutes. In sequence, Portions IV, V, and VI were separately premixed and added to the reactor. The reaction solution was then heated to reflux and held until the acid number is 0.5 or less. The resulting polymer solution has a 40% solids content.

The acrylic microgel resin was then prepared by charging the following to a nitrogen blanketed flask equipped as above:

|  | Parts by Weight |
|---|---|
| Portion I | |
| Methyl methacrylate | 11.3 |
| Mineral spirits (Exxsol ® D40 from Exxon) | 73.7 |
| Methyl methacrylate/Glycidyl methacrylate stabilizer copolymer (prepared above) | 5.4 |
| Heptane | 60.7 |
| 2,2'-azobis(2-methylbutyronitrile) (Vazo ® 67 from DuPont) | 0.35 |
| Portion II | |
| N,N-dimethylethanolamine | 0.5 |
| Methyl methacrylate | 216.2 |
| Methyl methacrylate/Glycidyl methacrylate stabilizer copolymer (prepared above) | 41.2 |
| Glycidyl methacrylate | 2.1 |
| Methacrylic acid | 2.1 |
| Heptane | 35.8 |
| Mineral Spirits (Exxsol ® D40 from Exxon) | 73.7 |
| Portion III | |
| 2,2'-azobis(2-methylbutyronitrile) (Vazo ® 67 from DuPont) | 0.8 |
| Toluene | 9.7 |
| Heptane | 23.4 |
| Portion IV | |
| n-Butanol | 7.8 |
| Portion V | |
| Hydroxy propyl acrylate | 49.1 |
| Methyl methacrylate/Glycidyl methacrylate stabilizer copolymer (prepared above) | 10.3 |
| Butyl methacrylate | 73.7 |
| Heptane | 11.5 |
| Portion VI | |
| t-Butylperoxy 2-Ethylhexanoate | 9.0 |
| n-Butanol | 43.0 |
| Heptane | 3.9 |
| Total | 765.25 |

Portion I was charged into the reaction vessel, heated to its reflux temperature, and held for 45 minutes. Portions II and III were premixed separately and then added simultaneously over a 120 minute period to the reaction vessel mixed while maintaining the reaction mixture at its reflux temperature. Portion IV was then added. Portions V and VI were premixed separately and then added concurrently to the batch over a 120 minute period while the mixture was maintained at reflux temperature. The mixture was then held at reflux temperature for 30 minutes.

The resulting polymer solution has a weight solids of 50%, and a viscosity of 60 centipoise.

Preparation of Clearcoat Example 1 and Comparative Examples 2 and 3

Clearcoat compositions useful in practicing the present process were prepared by blending together the following ingredients in the order given:

| INGREDIENTS | CLEARCOAT EXAMPLES | | |
|---|---|---|---|
| (all amounts parts by weight) | Ex. 1 | C. Ex. 2 | C. Ex. 3 |
| Fluorinated Acrylosilane Resin (from above) | 614.853 | 614.853 | |
| Fluoro-Urethane Additive (from above) | 8.131 | | |
| Non-fluorinated Acrylosilane Resin (from above) | | | 372.575 |
| Acrylic Microgel (from above) | 33.304 | 33.304 | 16.979 |
| Acrylic Polyol Resin (from above) | | | 187.030 |
| Acrylic NAD Resin (from above) | | | 28.338 |
| Solvesso ® 100 | 114.973 | 114.973 | 194.133 |
| Tinuvin ® 1130[1] (Benzotriazole UV Light Absorber) | 14.286 | 14.286 | 7.028 |
| Tinuvin ® 123[1] (Hindered Amine UV Light Absorber) | 2.968 | 2.968 | 1.460 |
| Tinuvin ® 384[1] (UV Light Absorber) | 12.689 | 12.689 | 6.242 |
| Tinuvin ® 079L[1] (Hindered Amine UV Light Absorber) | 26.531 | 26.531 | 13.052 |
| Disparlon ® LC-955 Surfactant[2] | 6.298 | 6.298 | 5.563 |
| Disparlon ® L-1984 Surfactant[2] | 2.563 | 2.563 | |

-continued

| INGREDIENTS | CLEARCOAT EXAMPLES | | |
|---|---|---|---|
| (all amounts parts by weight) | Ex. 1 | C. Ex. 2 | C. Ex. 3 |
| Blocked Acid Catalyst Solution (48.0% DDBSA/10.8% 2-amino methyl propanol 741.2% Methanol) | 21.772 | 21.772 | 17.803 |
| Ethyl 3-ethoxy Propionate | 25.576 | 25.576 | |
| n-Butanol | 2.890 | 2.890 | 2.890 |
| Ethylene Glycol Monobutyl Ether | 38.617 | 38.617 | 38.617 |
| Desmodur ® N-3300[3] Polyisocyanate | 175.845 | 175.845 | 175.845 |
| Phenyl Acid Phosphate | 2.442 | 2.442 | 2.442 |

Sources of above constituents are:
[1]Product of Ciba Specialty Chemical Company
[2]Product of King Industries
[3]Product of Bayer Corporation Phosphated steel panels that had been electrocoated with an electrocoating primer were sprayed and coated respectively with conventional solid black, silver metallic, and blue metallic solvent-borne base coating composition to form a basecoat about 0.5 to 1.0 mils thick. The basecoats were each given a flash of 5 minutes. Then the clearcoat paints formulated above were applied "wet-on-wet" over each of the basecoats to form a clearcoat layer about 1.8-2.2 mil thick. The panels were then fully cured by baking for 30 minutes at about 250° F., which is a typical OEM bake. The resulting coated panels were measured for the below properties, and results are tabulated in Table 2. A second set of panels were coated as specified above. Additionally, after cooling, a second basecoat/clearcoat repair coat layer was applied by the same procedure as the initial coat. No sanding or surface preparation was prepared prior to application of the repair basecoat. The resulting coated panels were also subjected to the tests specified below to evaluate adhesion and the amount of pickoff off the repair topcoating from the original topcoating was recorded. Results are reported in Tables 1 and 3 below.

The following properties of the OEM and Repair coat panel were measured: 200 Gloss, Distinctness of Image (DOI), Hardness, advancing and receding water contact angles and advancing and receding hexadecane solvent contact angles as determined by video contact angle system, initial cross hatch adhesion, cross hatch adhesion after 96 or 240 hours of exposure to 100% relative humidty at 400 Celsius, and primeness windshield bonding adhesion.

The contact angle measurements described above, in particular, were used to assess the cleanability and dirt retention of the clearcoated surfaces. Contact angles are measured by the Sessile Drop Method which is fully described in A. W. Adamson, The Physical Chemistry of Surfaces, 5th Ed., Wiley & Sons, New York, 1990, Chapter II which is hereby incorporated herein by reference.

Briefly, in the Sessile Drop Method, a drop of liquid, either water or solvent, is placed on a surface and the tangent is precisely determined at the point of contact between the drop and the surface. An advancing angle is determined by increasing the size of the drop of liquid and a receding angle is determined by decreasing the size of the drop of liquid. Additional information on the equipment and procedure needed to measure these contact angles are more fully described in R. H. Dettre, R. E. Johnson Jr., Wettability, Ed. by J. C. Berg, Marcel Dekker, New York, 1993, Chapter 1 which is incorporated herein by reference.

The relationship between water and organic liquid contact angles and cleanability and dirt retention is described in chapters XII and XIII of A. W. Adamson, above. In general, the higher the contact angle the more dirt or soil resistant the surface is and the easier the surface is to clean.

The cross-hatch adhesion measurements described above, in particular, were used to assess the adhesion of the original clearcoat to the original basecoat and the recoat adhesion of the repair basecoat to the original clearcoat. As indicated above, for recoat adhesion, the applied basecoats and clearcoats were baked for 30 minutes at 250° C. Within 24 hrs of the bake, the same basecoats and clearcoats were applied by the same procedure described above over the top of the baked OEM basecoat and clearcoat. The newly applied topcoats were baked again at 250° C. for 30 minutes. These recoated panels were then aged for a minimum of 24 hrs and tested for recoat adhesion according to the cross-hatch adhesion method described below.

Briefly, cross hatch adhesion was tested according to General Motors Test Procedure GM9071 P published by General Motors Corporation and ASTM D-3359-93. The test is performed on panels aged at room temperature for 72 hours after baking. Panels are scribed in a grid pattern and adhesive tape is applied over scribe marks, then tape is pulled rapidly from the film. The magnitude of observed removal of coating from the substrate indicates adhesion quality. Rate the percentage of grid or cross hatch area from which coating was removed. A rating of 5% or more paint film removed is considered a failure.

In order to test for primerless windshield bonding adhesion, a bead of windshield adhesive was applied to the clearcoat surface after baking. The windshield adhesive used is commercially available from Dow Essex Specialty Products Company. Approximately a 5 mm×5 mm×250 mm adhesive bead was placed on the cured clearcoat surface. The adhesive plus clear composite was cured for 72 hours at about 75° F. (24° C.) and 20-50% relative humidity. The cured adhesive bead was cut with a razor blade. A cut was made through the adhesive bead at a 60° angle at 12 mm intervals while pulling back the edge of the adhesive at a 180° angle. A minimum of 10 cuts was done for each system. The desired result is described as 100% cohesive failure (CF). Cohesive failure (CF) occurs when the integrity of the adhesive bead is lost as a result of cutting and pulling rather than the bond between the adhesive bead and the clearcoat surface. The results over a few colored basecoats, for both OEM initial coat and Repair coat films are summarized in the tables, below.

TABLE 1

Repair Coat Test Results

| | | Cross Hatch | |
|---|---|---|---|
| | | Initial | 96 hour |
| Clearcoat | Basecoat | % Film Loss | |
| Ex 1 | Blue Met | 0 | 0 |
| C. Ex. 2 | Blue Met | >65 | >65 |

The above results show that the clear coating compositions made using the fluorinated urethane additive of this invention (Ex. 1) exhibit recoat adhesion, while comparative systems that do not contain the additive (C.Ex. 2) do not possess the required recoat adhesion properties.

TABLE 2

OEM Initial Coat Test Results

| | | | | | Contact Angles using Video Contact Angle System | | | | | | Humidity Adhesion | | Windshield |
| | | | | | Deionized Water | | | | Hexadecane | | Initial | 240 hr hum | Bonding |
| | | | 20° | | Advancing | | Receding | | Advancing | | Receding | | Cross Hatch | Humidity |
| Clearcoat | Basecoat | DOI | Gloss | Tukon | Avg. | S.D. | Avg. | S.D. | Avg. | S.D. | Avg. | S.D. | % Film Loss | Result |
|---|---|---|---|---|---|---|---|---|---|---|---|---|---|---|
| Ex 1 | SilverMet | 84 | 90 | 15.1 | 98.5 | 1.0 | 75.3 | 1.5 | 44.3 | 1.5 | 36.3 | 0.5 | 0 | 0 | Pass 100 CF |
| C. Ex 3 | SilverMet | 91 | 91 | 12.6 | 90.0 | 0.0 | 72.0 | 1.5 | 10.7 | 1.4 | 6.3 | 0.5 | 0 | 0 | Pass 100 CF |
| Ex. 1 | Black | 88 | 88 | 12.6 | 99.5 | 1.0 | 77.3 | 0.5 | 49.7 | 0.5 | 38.7 | 1.4 | 0 | 0 | Pass 100 CF |
| C. Ex. 3 | Black | 93 | 87 | 12.1 | 89.8 | 0.8 | 74.0 | 0.9 | 13.7 | 1.0 | 7.0 | 0.0 | 0 | 0 | Pass 100 CF |

TABLE 3

Repair Coat Test Results

| | | | | | Contact Angles using Video Contact Angle System | | | | | | | | Humidity Adhesion | |
| | | | | | Deionized Water | | | | Hexadecane | | | | Initial | 240 h hum. |
| | | | 20° | | Advancing | | Receding | | Advancing | | Receding | | Cross Hatch | |
| Clearcoat | Basecoat | DOI | Gloss | Tukon | Avg. | S.D. | Avg. | S.D. | Avg. | S.D. | Avg. | S.D. | % Film Loss | |
|---|---|---|---|---|---|---|---|---|---|---|---|---|---|---|
| Ex. 1 | SilverMet | 77 | 89 | 15.5 | 102.0 | 1.5 | 75.0 | 1.5 | 46.7 | 1.5 | 0.5 | 0.0 | 0 | 0 |
| C. Ex. 3 | SilverMet | 77 | 89 | 11.4 | 91.7 | 1.4 | 75.5 | 0.5 | 11.7 | 11.7 | 0.5 | 0.9 | 0 | 0 |
| Ex. 1 | Black | 85 | 88 | 12.2 | 101.7 | 0.5 | 77.0 | 0.9 | 48.5 | 2.7 | 37.3 | 0.5 | 0 | 0 |
| C. Ex. 3 | Black | 97 | 87 | 9.7 | 90.0 | 0.0 | 74.7 | 1.4 | 13.0 | 0.9 | 5.3 | 0.5 | 0 | 0 |

The above results show that the clear coating compositions made using the fluorinated urethane additive of this invention (Ex. 1) not only have a high contact angle for water and for solvents which provides for a finish which is resistant to soiling and is easily washed or wiped clean, but also have the required recoat adhesion properties which enable the operation of the process of the present invention. The non-fluorinated acrylosilane polymer-containing clearcoat composition (C.Ex. 3), which corresponds to a commercial clearcoat composition, does not exhibit as good as cleanability for nearly all colors.

Various modifications, alterations, additions or substitutions of the process and compositions of this invention will be apparent to those skilled in the art without departing form the scope and spirit of this invention, and it should be understood that this invention is not limited to the illustrated embodiments set forth herein, but rather as recited in the following claims.

What is claimed is:

1. A method for in-line or end-of line repair of an original basecoat/topcoat finish on an automobile or truck during their original manufacture, in which the original topcoat comprises a substantially cured fluorinated silane polymer, wherein the improvement comprises:
    (a) incorporating in the original topcoat, an adhesion improving additive comprising a fluorinated urethane compound;
    (b) applying over said original topcoat, a repair basecoat composition comprising an aminoplast resin crosslinking agent;
    (c) applying over said repair basecoat, a repair topcoat composition; and
    (d) curing the new basecoat/topcoat finish, wherein the fluorinated urethane compound consists essentially of an adduct of an organic polyisocyanate, a polyoxyethylene/polyoxypropylene glycol, and a fluorinated monofunctional alcohol, and contains substantially no residual isocyanate groups; or an adduct of an organic polyisocyanate, an amino-functional silane, and a fluorinated monofunctional alcohol, and contains substantially no residual isocyanate groups.

2. The method of claim 1, wherein the repair topcoat is applied over said repair basecoat wet-on-wet and the new top coat and basecoat are cured together.

3. The method of claim 1, wherein the coating compositions for both the original basecoat/topcoat and repair basecoat/topcoat are the same, so that only one topcoat and one basecoat composition are used.

4. The method of claim 1, wherein the fluorinated urethane compound is employed in the original topcoat composition in an amount of about 0.1-10% by weight, based on the weight of the binder of the original topcoat.

5. A substrate coated according to the method of claim 1.

6. The method of claim 1 wherein the original topcoat composition comprises about 45-90% by weight of a film forming binder and 10-55% by weight of an organic liquid carrier; wherein the binder comprises:
    (A) about 10 to 90% by weight, based on the weight of the binder, of a film-forming fluorinated organosilane polymer consisting essentially of about 5 to 98% by weight, based on the weight of the polymer, of polymerized ethylenically unsaturated monomers which do not contain a silane or a fluorine functionality, about 1.5 to 70% by weight, based on the weight of the polymer, of ethylenically unsaturated monomers which contain a silane functionality, and about 0.5-25% by weight, based on the weight of the polymer, of polymerized ethylenically unsaturated monomers which contain a fluorine functionality, (B) about 0 to 60%, based on the weight of the binder, of a non-aqueous dispersed polymer, and (C) about 10 to 90% by weight, based on the weight of the binder, of an crosslinking agent selected from one or both of an organic polyisocyanate and melamine crosslinking agent; and wherein the composition further comprises:

(D) about 0.1 to 15% by weight, based on the total weight of binder solids in the composition, of a fluorinated urethane compound_wherein the fluorinated urethane compound consists essentially of an adduct of an organic polyisocyanate, a polyoxyethylene/polyoxypropylene glycol, and a fluorinated monofunctional alcohol, and includes substantially no residual isocyanate groups; or an adduct of an organic polyisocyanate, an amino-functional silane, and a fluorinated monofunctional alcohol, and contains substantially no residual isocyanate groups.

7. An automobile or truck top coated by the process of claim 6.

8. A method for improving the adhesion of a repair coating to a coated substrate, which comprises:

(a) applying to a substrate at least one coating composition comprising a film-forming binder comprising a fluorinated silane polymer and an adhesion improving additive comprising a fluorinated urethane compound;

(b) curing the at least one coating composition to provide a coated substrate;

(c) applying to the coated substrate one or more repair coatings wherein the first repair coating applied to the substrate comprise an aminoplast resin crosslinking agent;

(d) curing the one or more repair coatings to form a new finish over said substrate, wherein the fluorinated urethane compound consists essentially of an adduct of an organic polyisocyanate, a polyoxyethylene/polyoxypropylene glycol, and a fluorinated monofunctional alcohol, and contains substantially no residual isocyanate groups; or an adduct of an organic polyisocyanate, an amino-functional silane, and a fluorinated monofunctional alcohol, and contains substantially no residual isocyanate groups.

* * * * *